(12) United States Patent
Kunze et al.

(10) Patent No.: US 8,480,524 B2
(45) Date of Patent: Jul. 9, 2013

(54) MULTISPEED SPUR GEAR TRANSMISSION WITH A PLANETARY GEAR STAGE

(75) Inventors: Christian Kunze, Gross-Gerau (DE); Mathias Remmler, Mauchenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/153,116

(22) Filed: Jun. 3, 2011

(65) Prior Publication Data

US 2011/0300985 A1 Dec. 8, 2011

(30) Foreign Application Priority Data

Jun. 8, 2010 (DE) .......................... 10 2010 023 080

(51) Int. Cl.
*F16H 3/72* (2006.01)

(52) U.S. Cl.
USPC ............................................................ 475/5

(58) Field of Classification Search
None
See application file for complete search history.

(56) References Cited

U.S. PATENT DOCUMENTS

| 6,371,877 B1 * | 4/2002 | Schroeder et al. ................ 475/5 |
| 6,502,652 B2 | 1/2003 | Rogg |
| 8,075,436 B2 | 12/2011 | Bachmann |
| 8,235,853 B2 * | 8/2012 | Lutoslawski ...................... 475/5 |
| 2003/0069103 A1 * | 4/2003 | Ibamoto et al. ................... 475/5 |
| 2010/0108414 A1 | 5/2010 | Kaltenbach |

FOREIGN PATENT DOCUMENTS

| EP | 0845618 A2 | 6/1998 |
| JP | 2010179859 A | 8/2010 |

* cited by examiner

*Primary Examiner* — Dirk Wright
(74) *Attorney, Agent, or Firm* — Ingrassia Fisher & Lorenz, P.C.

(57) ABSTRACT

A multispeed spur gear transmission is provided with a planetary gear stage. The multispeed spur gear transmission includes, but is not limited to a spur gear pairing for each gear, a clutch bell with clutch device for coupling a transmission input to a motor output shaft, at least one transmission drive shaft and a transmission output shaft for receiving the spur gear pairings of the gears and a transmission output with an output gear on the transmission output shaft. Between the clutch bell and the transmission input the planetary gear stage is arranged, whose planetary gear cage includes, but is not limited to a spur gear rim that meshes with at least one first spur gear of a rotor shaft of an electrodynamic device.

10 Claims, 3 Drawing Sheets

MULTISPEED SPUR GEAR TRANSMISSION WITH A PLANETARY GEAR STAGE

CROSS-REFERENCE TO RELATED APPLICATION

This application claims priority to German Patent Application No. 102010023080.4, filed Jun. 8, 2010, which is incorporated herein by reference in its entirety.

TECHNICAL FIELD

The technical field relates to a multispeed spur gear transmission with a planetary gear stage. The multispeed spur gear transmission comprises a spur gear pairing for each gear, a clutch bell with clutch device for coupling a transmission input to a motor output shaft, at least one transmission drive shaft and one transmission output shaft for receiving the spur gear pairings of the gears and a transmission output with an output gear on the transmission output shaft.

BACKGROUND

A multispeed spur gear transmission for a motor vehicle is known from the publication U.S. Pat. No. 6,502,652 B2. There the additional planetary gear stage serves for the torque bridging on upshifting in the lower gears of the multispeed spur gear transmission since in these shifting ranges a conventional manual multispeed spur gear transmission requires torque interruptions in order to be able to shift into the next higher gears in a synchronized manner. In this phase, no power is transmitted to the chassis of the vehicle with the conventional multispeed spur gear transmission. This torque lack is bridged with the planetary gear stage additionally known from the above publication, wherein the planetary gear stage can be coupled to the output gear on the transmission output shaft via an internal gear. A disadvantage of the known multispeed spur gear transmission with a planetary gear stage is that the possibilities of using this additional planetary gear stage are only utilized to a limited extent.

At least one object is to overcome the disadvantages in the prior art and to create a multispeed spur gear transmission with a planetary gear stage that utilizes a wider field of application of the planetary gear stage and makes possible additional new functions in the power transmission. In addition, other objectives, desirable features and characteristics will become apparent from the subsequent summary and detailed description, and the appended claims, taken in conjunction with the accompanying drawings and this background.

SUMMARY

According to the application, a multispeed spur gear transmission with a planetary gear stage is created. The multispeed spur gear transmission comprises a spur gear pairing for each gear, a clutch bell with clutch device for coupling a transmission input on a motor output shaft, at least one transmission drive shaft and a transmission output shaft for receiving the spur gear pairings of the gears and a transmission output with an output gear on the transmission output shaft. Between the clutch bell and the transmission input the planetary gear stage is arranged whose planetary gear cage comprises a spur gear rim, which meshes with at least one first spur gear rim of a rotor shaft of an electrodynamic device.

This multispeed spur gear transmission with additional planetary gear stage has the advantage that even when braking the internal gear of the planetary gear stage, torque bridging or torque boosting on upshifting in the lower gears of the multispeed spur gear transmission is possible and in addition the step-down transmission ratio between a sun gear of the planetary gear stage and of the spur gear rim of the planetary gear stage is available in this embodiment of the application, since the sun gear is mechanically connected to the flyweight mass of the clutch device and thus with the motor output shaft.

Through the meshing of at least one spur gear connected to a rotor shaft of the electrodynamic device with the spur gear rim of the transmission gear cage, recuperative braking or recuperative downhill driving of the vehicle for energy reclamation can be utilized for the internal gear of the planetary gear stage following the switching-over of the electrodynamic device into a generator mode through a control unit with simultaneous braking of the internal gear of the planetary gear stage in a first shifting position of the braking device.

In addition to this, it is advantageously possible that during the switching over of the electrodynamic device into the motor mode with the help of the control unit subject to the braking of the internal gear of the planetary gear stage the motor mode of the electrodynamic device can be utilized for supporting the torque of the combustion engine. This assisting mode or booster mode is particularly helpful when starting the vehicle.

Thus, even at least one spur gear interacting with the rotor shaft of the electrodynamic device allows three advantageous application possibilities of the additional planetary gear stage through recuperative braking or downhill driving, through boosting in starting mode and/or through torque boosting on upshifting in the lower gears of the multispeed spur gear transmission. This is made possible since in this application a spur gear rim of the planetary gear cage interacts with the electrodynamic device via a spur gear of the rotor shaft.

In a further embodiment of the application the rotor shaft of the electrodynamic device not only comprises one spur gear, but two spur gears, wherein both spur gears are rotatably mounted on the rotor shaft and can be coupled via a synchronizing device of the rotor shaft. The additional second spur gear which is rotatably mounted on the rotor shaft and can be coupled to the latter in a second position of the synchronizing device, meshes with an outer spur gear rim of the internal gear.

This has the advantage that with the vehicle stationary the electrodynamic device can be put into a motor operating state which now with the vehicle stationary and the combustion engine stationary serves as starter motor in that a torque is transmitted to the internal gear via the second spur gear and because of the stationary state of the vehicle the planetary gear cage is fixed or braked and thus the sun gear now starts the motor output shaft or the motor crankshaft until the motor starts and the synchronizing device slides back into its neutral position.

This second position of the synchronizing device can also be utilized in order to employ the electrodynamic device now switched as electric motor via the second spur gear on the rotor shaft for torque support when driving off or accelerating the vehicle. Whenever the synchronizing device is located in this second position the braking device of the planetary gear stage releases the internal gear.

In the first position of the synchronizing device the first spur gear on the rotor shaft is connected to the rotor shaft in a rotationally fixed manner. In this first position the internal gear of the planetary gear stage is not braked for as long as the electrodynamic device is operated in motor mode or in generator mode or recuperation mode. In a neutral position of the synchronizing device the braking device can block the internal gear for assisting the torque during the torque interruption phases on upshifting in the lower gears. To this end, the braking device comprises an actuator which optionally brakes the internal gear of the planetary gear stage in a first switching position and releases the internal gear of the planetary gear in a second switching position.

The braking device itself comprises a plurality of ring elements, wherein a first middle ring element comprises a central brake disk with brake linings arranged on both sides, which is connected to the internal gear and two pressure rings which are arranged on both sides of the brake disk and are connected to the clutch bell of the transmission housing in a rotationally fixed but axially displaceable manner. For braking, the pressure rings can be pressed against the brake disk of the internal gear through axial displacement.

In the second switching position of the braking device the internal gear is released so that the multispeed spur gear transmission can be shifted in accordance with the spur gear pairings if the synchronizing device simultaneously is in its neutral position and the rotor shaft can thus not be rotated by the two spur gears.

If the synchronizing device is in the first position, it couples the first spur gear of the rotor shaft to the rotor shaft, while the first spur gear meshes with the spur gear rim of the planetary gear cage and the output gear of the transmission output shaft. If the synchronizing device is in the second position, the second spur gear of the rotor shaft is coupled to the rotor shaft and the second spur gear meshes with a spur gear rim of the internal gear, while the brake is in its second switching position subject to the release of the internal gear.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
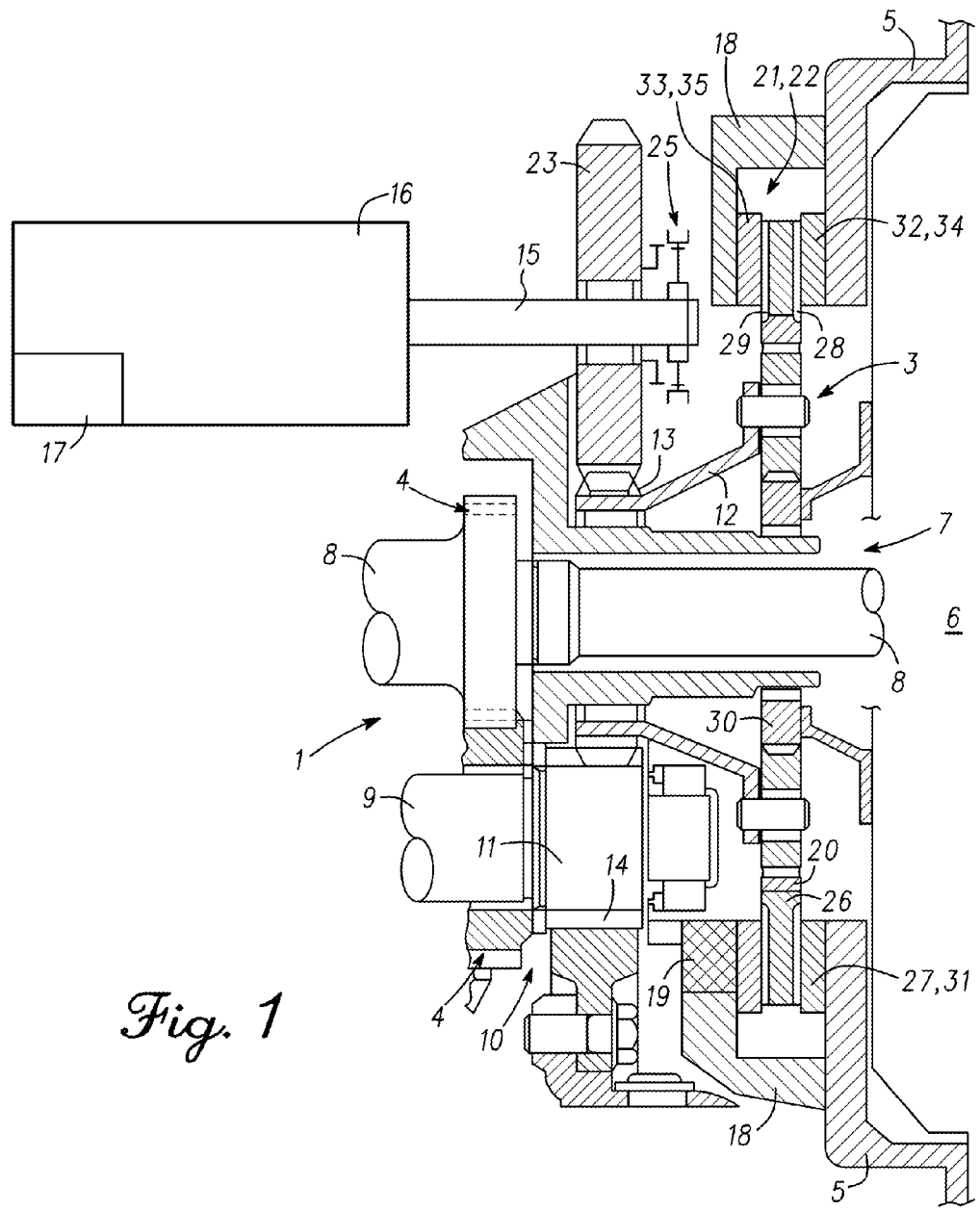
FIG. 1 shows a schematic cross-sectional view of a part region of a multispeed spur gear transmission with planetary gear stage of a first embodiment of the application.

FIG. 1 shows a schematic cross-sectional view of a part region of a multispeed spur gear transmission 1 with planetary gear stage 3 of a first embodiment of the application. The multispeed spur gear transmission 1 comprises a spur gear pairing 4 for each gear, a clutch bell 5 with clutch device 6 for coupling a transmission input 7 to a motor output shaft, at least one transmission drive shaft 8 and a transmission output shaft 9 for receiving the spur gear pairings 4 of the gears and a transmission output 10 with an output gear 11 on the transmission output shaft 9.

Between the clutch bell 5 and the transmission input 7 the planetary gear stage 3 is arranged, whose planetary gear cage 12 comprises a spur gear rim 13 which meshes with a first spur gear rim 23 of a rotor shaft 15 of an electrodynamic device 16. This electrodynamic device 16 comprises a control unit 17 which is able to switch the electrodynamic device 16 from a motor operating state into a generator operating state and vice versa. On the rotor shaft 15 a first spur gear 23 is rotatably arranged, which by means of a synchronizing device 25 effective on both sides can be brought into engagement with the rotor shaft 15.

The first spur gear 23 on the rotor shaft 15 meshes with the spur gear rim 13 of the planetary gear cage 12, while a braking device 18 with a brake disk 27, which is designed as first ring element 31, is connected to an internal gear 20 of the planetary gear stage 3 so that the braking device can be activated with the help of an actuator 19 and two further ring elements 32 and 33, which are designed as pressure rings 34 and 35 respectively, can be pressed against brake linings 28 ad 29 of the brake disk 27 for blocking the internal gear 20.

With this first embodiment of the application, the planetary gear cage 12, with neutral position of the synchronizing device as shown in FIG. 1 and braked internal gear 20 can be utilized to bridge or assist torque interruptions on upshifting from low gears of the multispeed spur gear transmission 1 so that particularly on uphill driving no power drop is incurred on the chassis. To this end, the sun gear 30 of the planetary gear stage 3 is connected to a flyweight of the clutch device 6 and thus to the motor output shaft or the crankshaft.

In this torque bridging or boosting phase the internal gear 20 is blocked in a first switching position 21 of the actuator 19 of the braking device 18 so that the combustion engine now transmits for torque boosting to the differential gear which is not shown here via the step-down ratio between sun gear 30 and planetary gear cage 12 and the step-up ratio between the spur gear rim 13 of the planetary gear cage and the spur gear rim 14 of the output gear 11.

In addition to this function, an additional torque can be transmitted to the output gear 11 and thus to the differential through engaging the unilaterally effective synchronizing device 25 with switching over into the motor mode with the help of the control unit 17 so that boosting is possible. To this end, however, the brake disk of the braking device 18 is brought into a second switching position with the help of the actuator 19, with which the brake disk 27 and thus the internal gear 20 run freely. Furthermore it is possible in driving mode to utilize recuperative braking or downhill driving in that in turn the braking device 18 is brought into the second switching position subject to releasing of the internal gear 20 and the unilaterally acting synchronizing device 25 is engages and the electrodynamic device 16 additionally put into the generator state with the help of the control unit 17.

Figure 2:
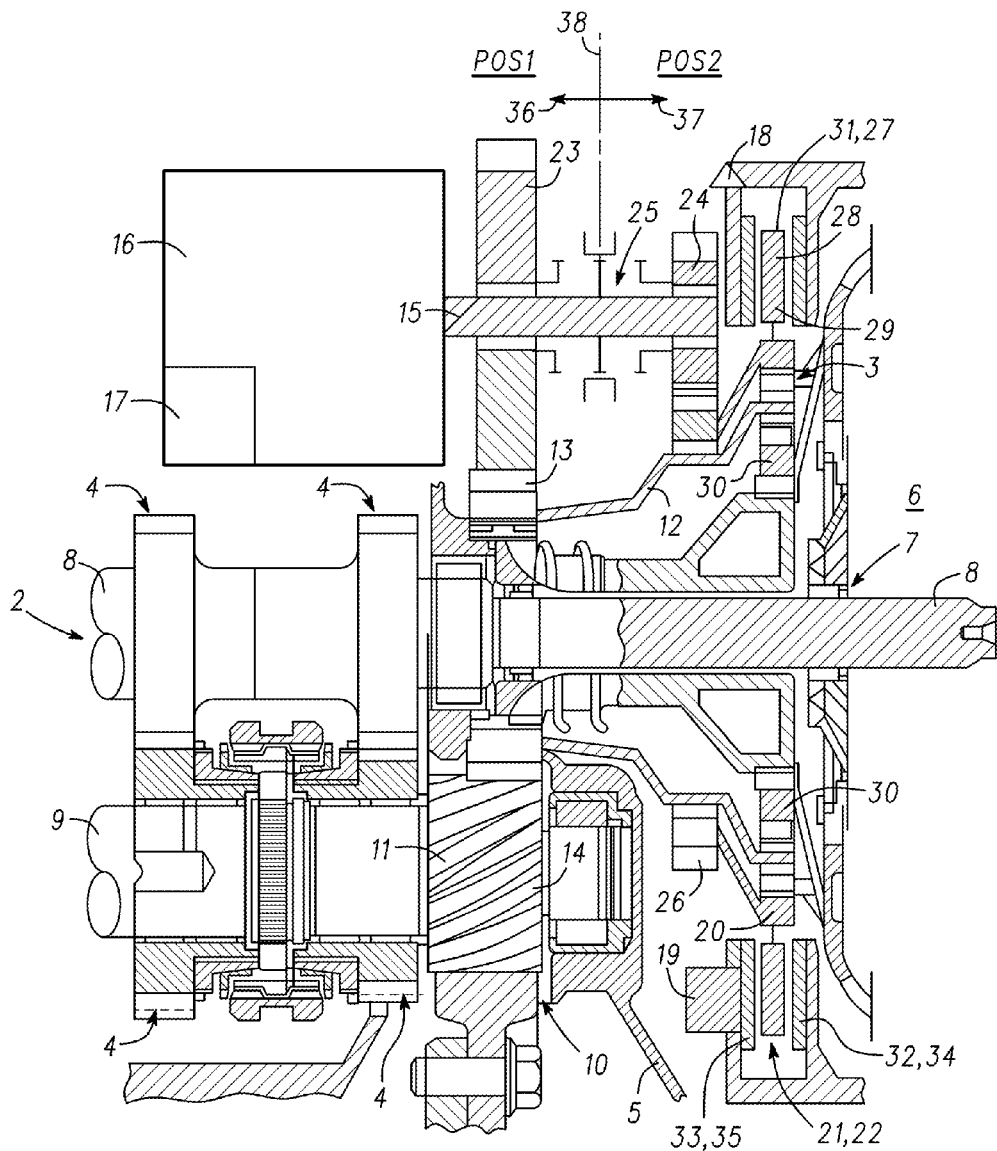
FIG. 2 shows a schematic cross-sectional view of a part region of a multispeed spur gear transmission according to a second embodiment of the application.

FIG. 2 shows a schematic cross-sectional view of a part region of a multispeed spur gear transmission 2 according to a second embodiment of the application. Components with same functions as in FIG. 1 are marked with same reference characters and are not explained separately. In this embodiment, two spur gears 23 and 24 are rotatably mounted on the rotor shaft 15, which can be optionally brought into engagement with the rotor shaft with a synchronizing device 25 effective in a double-sided manner. For as long as the synchronizing device effective in a double-sided manner connects the spur gear 23 to the rotor shaft in a first position 36 or optionally is held in the shown neutral position 38, the advantageous functions as were already explained to FIG. 1, can be made available to the vehicle through the planetary gear stage 3 in interaction with the braking device and the synchronizing device. For torque boosting or torque bridging the synchronizing device is to be brought into a neutral position 38 so that none of the two spur gears 23 and 24 are engaged with the rotor shaft 15.

The second engagement position 37 of the synchronizing device 25 connects the second spur gear 24 on the rotor shaft 15 to the rotor shaft 15, while the second spur gear 24 meshes with an outer spur gear rim of the internal gear 20. This can be utilized so that with the vehicle stationary, when the planetary gear cage 12 is practically blocked and the internal gear 20 through the braking device 18 is practically released in that the actuator 19 moves into the second switching position 22, the electrodynamic device 16 as motor now assumes the starter motor function for the combustion engine. For the sun gear 30 is mechanically connected to the flyweight mass of the clutch device 6 so that the crankshaft or the motor output shaft via the sun gear 30 through the electrodynamic device 16 is driven as starter motor pending the starting-up of the combustion engine. Thus, the conventional starter motor for a combustion engine can be dispensed with. In addition to this, the electrodynamic device as motor can transmit an additional torque to the output gear and thus to the differential which is not shown and serve as booster motor also in the second position of the synchronizing device.

Figure 3:
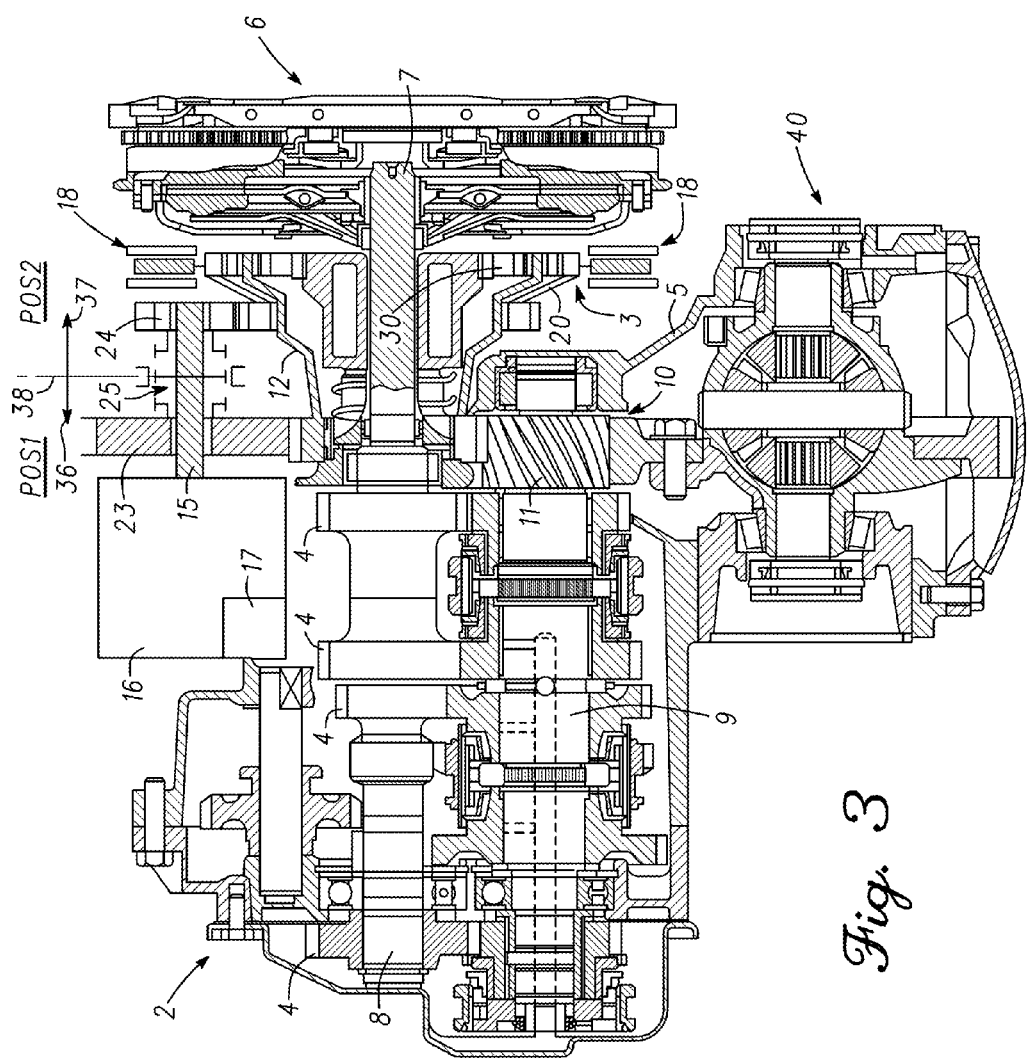
FIG. 3 shows a schematic cross-sectional view of a multispeed spur gear transmission according to the second embodiment of the application.

FIG. 3 shows a schematic cross-sectional view of a multispeed spur gear transmission 2 of the second embodiment of the application. Components with same functions as in the preceding Figures are marked with the same reference characters and are not explained separately. FIG. 3 shows the interaction of the output gear 11 with an outer spur gear rim 39 of a differential gear 40 and in addition to this the interaction of the sun gear 30 of the planetary gear stage 3 with the flyweight mass of the clutch device 6 in the clutch bell 5. The multispeed spur gear transmission 2 shown here merely comprises one transmission input shaft 8 and one transmission output shaft 9, but the planetary gear stage 3 can also be employed in multispeed spur gear transmissions having two transmission input shafts, in order to utilize the advantages of the different functions of this additional planetary gear stage 3 shown above.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A planetary gear stage of a multispeed spur gear transmission, comprising:
    a first spur gear and a second spur gear forming a pairing for each gear of the multispeed spur gear transmission;
    a clutch bell with a clutch device configured for coupling a transmission input to a motor output shaft;
    a transmission drive shaft and a transmission output shaft configured for receiving the pairing for each gear; and
    a transmission output with an output gear on the transmission output shaft;
    a planetary gear cage between the clutch bell and the transmission input the planetary gear stage, the planetary gear cage comprising a spur gear rim that meshes with the first spur gear of a rotor shaft of an electrodynamic device.

2. The multispeed spur gear transmission according to claim 1, wherein the electrodynamic device comprises a control unit configured for control of a motor operation.

3. The multispeed spur gear transmission according to claim 1, further comprising a braking device comprising an actuator having a first switching position that brakes an internal gear of the planetary gear stage and in a second switching position that releases the internal gear of the planetary gear stage.

4. The multispeed spur gear transmission according to claim 3, wherein the first spur gear and the second spur gear rotatably mounted on the rotor shaft, and
    a synchronizing device between the first spur gear and the second spur gear and connected to the rotor shaft in a rotationally fixed manner.

5. The multispeed spur gear transmission according to claim 4, wherein the first spur gear is configured to engage with the spur gear rim of the planetary gear cage and the output gear on the transmission output shaft.

6. The multispeed spur gear transmission according to claim 5, wherein the second spur gear is configured to engage with the spur gear rim of the internal gear of the planetary gear stage.

7. The multispeed spur gear transmission according to claim 5, wherein the braking device comprises:
    a plurality of ring elements;
    a first middle ring element comprising a central brake disk with brake linings arranged on both sides that is connected to the internal gear; and
    two pressure rings arranged on both sides of the central brake disk and arranged on the clutch bell of a transmission housing in a rotationally fixed and axially displaceable manner,
    wherein the two pressure rings for braking the internal gear are pressed against the central brake disk through axial displacement.

8. The multispeed spur gear transmission according to claim 3, wherein in the second switching position, the multispeed spur gear transmission is switchable in accordance with the pairing.

9. The multispeed spur gear transmission according to claim 4,
    wherein the synchronizing device in a first position couples the first spur gear of the rotor shaft to the rotor shaft, and
    wherein the first spur gear is configured to mesh with the spur gear rim of the planetary gear cage and with the output gear of the transmission output shaft.

10. The multispeed spur gear transmission according to claim 4,
    wherein the synchronizing device in a second position couples the second spur gear of the rotor shaft to the rotor shaft, and
    wherein the second spur gear is configured to mesh with the spur gear rim of the internal gear.

* * * * *